US009367396B2

(12) United States Patent
Bonwick

(10) Patent No.: US 9,367,396 B2
(45) Date of Patent: *Jun. 14, 2016

(54) METHOD AND SYSTEM FOR SERVICE-AWARE PARITY PLACEMENT IN A STORAGE SYSTEM

(71) Applicant: DSSD, Inc., Menlo Park, CA (US)

(72) Inventor: Jeffrey S. Bonwick, Los Altos, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,862

(22) Filed: Dec. 19, 2014

(65) Prior Publication Data

US 2015/0205670 A1     Jul. 23, 2015

Related U.S. Application Data

(63) Continuation of application No. 14/162,250, filed on Jan. 23, 2014, now Pat. No. 8,949,692.

(51) Int. Cl.
*G06F 11/10* (2006.01)
*G06F 3/06* (2006.01)
*G06F 12/02* (2006.01)

(52) U.S. Cl.
CPC .......... *G06F 11/1096* (2013.01); *G06F 3/0604* (2013.01); *G06F 3/0619* (2013.01); *G06F 3/0647* (2013.01); *G06F 3/0689* (2013.01); *G06F 11/1076* (2013.01); *G06F 12/0253* (2013.01); *G06F 3/0634* (2013.01); *G06F 2212/1032* (2013.01); *G06F 2212/262* (2013.01); *G06F 2212/403* (2013.01)

(58) Field of Classification Search
CPC .................................................. G06F 11/1076
USPC .................................. 714/766, 801, 752, 6.2
See application file for complete search history.

(56) References Cited

U.S. PATENT DOCUMENTS 3,833,882 A * 9/1974 Busby .......................... 382/182
5,488,701 A    1/1996 Brady et al.
(Continued)

FOREIGN PATENT DOCUMENTS

WO     2005/043378 A2    5/2005

OTHER PUBLICATIONS

Extended European Search Report in counterpart European Application No. 15152142.4 issued Jun. 12, 2015 (8 pages).
(Continued)

*Primary Examiner* — Fritz Alphonse
(74) *Attorney, Agent, or Firm* — Osha Liang LLP

(57) ABSTRACT

A method and system for service-aware parity placement in a storage system, including after receiving the service notification specifying a target SD: writing a RAID stripe to the persistent storage, where the parity block of the RAID stripe is stored on the target SD and none of the data blocks in the RAID stripe are stored on the target SD. The method further includes performing a modified garbage collection operation that includes identifying a live RAID stripe in the persistent storage, writing a new RAID stripe to a new location in the persistent storage, where the new RAID stripe includes a copy of at least a portion of data from the live RAID stripe and a parity block in the new RAID stripe is stored on the target SD, and issuing a removal notification when the modified garbage collection operation is completed.

20 Claims, 14 Drawing Sheets

(56) References Cited

U.S. PATENT DOCUMENTS

| | | | | |
|---|---|---|---|---|
| 5,889,934 | A | * | 3/1999 | Peterson .................. 714/6.12 |
| 7,424,637 | B1 | * | 9/2008 | Schoenthal et al. ........... 714/6.2 |
| 8,209,578 | B2 | * | 6/2012 | Galbraith et al. ............ 714/752 |
| 8,949,692 | B1 | * | 2/2015 | Bonwick .................... 714/766 |

OTHER PUBLICATIONS

Extended European Search Report in counterpart European Application No. 15152145.7 issued Jun. 12, 2015 (9 pages).

* cited by examiner

METHOD AND SYSTEM FOR SERVICE-AWARE PARITY PLACEMENT IN A STORAGE SYSTEM

CROSS-REFERENCE TO RELATED APPLICATIONS

The instant application is a continuation of U.S. Pat. No. 8,949,692 and claims benefit under 35 U.S.C. §120 to U.S. Pat. No. 8,949,692. U.S. Pat. No. 8,949,692 is hereby incorporated by reference in its entirety.

BACKGROUND

In order to protect against potential loss of data in a storage system, it is often advantageous to implement a replication scheme. Current replication schemes do not take hardware service schedules of the storage system into account when writing data and parity values.

SUMMARY

In general, in one aspect, the invention relates to a non-transitory computer readable medium comprising instructions, which when executed by a processor perform a method, the method comprising receiving a service notification specifying a target storage device (SD), wherein the target SD is one of plurality of SDs, after receiving the service notification: receiving a request to write data to persistent storage, wherein the persistent storage comprises the plurality of SDs; in response to the request, writing a Redundant Array of Independent Disks (RAID) stripe to the persistent storage wherein the RAID stripe comprises first data blocks and a first parity block, wherein at least one of the first data blocks comprises a portion of the data, wherein the first parity block comprises a parity value calculated using the first data blocks, and wherein the first parity block is stored on the target SD, and wherein none of the first data blocks are stored on the target SD; performing a modified garbage collection operation, wherein the modified garbage collection operation comprises: identifying a live RAID stripe in the persistent storage, wherein the live RAID stripe comprises second data blocks and a second parity block; writing a new RAID stripe to a new location in the persistent storage, wherein the new RAID stripe comprises a third parity block and third data blocks, wherein at least one of the third data blocks stores a copy of a portion of data from the live RAID stripe, wherein the third parity block is stored on the target SD, and wherein none of the third data blocks is stored on the target SD; and issuing a removal notification when the modified garbage collection operation is completed, wherein the removal notification indicates that the target SD may be removed from the persistent storage.

In general, in one aspect, the invention relates to a system. The system includes a system, comprising a storage array comprising a plurality of storage devices (SDs), and a storage controller operatively connected to the storage array and configured to: identify a target SD to remove, after identifying the target SD, wherein the target SD is one of the plurality of SDs: receive a request to write data to the storage array, in response to the request, write a Redundant Array of Independent Disks (RAID) stripe to persistent storage, wherein the RAID stripe comprises data blocks and a first parity block, wherein at least one of the data blocks comprises a portion of the data, wherein the first parity block comprises a parity value calculated using the data blocks, and wherein the first parity block is stored on the target SD and wherein none of the data blocks are stored on the target SD, perform a modified garbage collection operation, wherein the modified garbage collection operation comprises: identifying a live RAID stripe in the persistent storage, wherein the live RAID stripe comprises second data blocks and a second parity block; writing a new RAID stripe to a new location in the persistent storage, wherein the new RAID stripe comprises a third parity block and third data blocks, wherein at least one of the third data blocks stores a copy of a portion of data from the live RAID stripe, wherein the third parity block is stored on the target SD, and wherein none of the third data blocks is stored on the target SD; and issue a removal notification when the modified garbage collection operation is completed, wherein the removal notification indicates that the target SD may be removed from the storage array.

In general, in one aspect, the invention relates to a non-transitory computer readable medium comprising instructions, which when executed by a processor perform a method, the method comprising receiving a service notification specifying a target storage device (SD), wherein the target SD is one of plurality of SDs, after receiving the service notification: receiving a request to write data to persistent storage, wherein the persistent storage comprises the plurality of SDs; in response to the request, writing a Redundant Array of Independent Disks (RAID) stripe to the persistent storage wherein the RAID stripe comprises data blocks and a first parity block, wherein at least one of the data blocks comprises a portion of the data, wherein the first parity block comprises a parity value calculated using the data blocks, and wherein the parity block is stored on the target SD and wherein none of the data blocks are stored on the target SD; performing a modified garbage collection operation, wherein the modified garbage collection operation comprises: writing a new RAID stripe to a new location in the persistent storage, wherein the new RAID stripe comprises a copy of a first data from a first live RAID stripe and a copy of second data from a second live RAID stripe in the storage array, and wherein the new RAID stripe comprises a second parity block located on the target SD; and issuing a removal notification when the modified garbage collection operation is completed, wherein the removal notification indicates that the target SD may be removed from the persistent storage.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1-10B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to storing data in a storage array using a RAID scheme. More specifically, the RAID scheme uses information about storage devices that are to be removed and/or replaced when determining RAID stripe geometry for new and live RAID stripes.

For purposes of this invention, the term "RAID" as used herein refers to "Redundant Array of Independent Disks." While "RAID" refers to any array of independent disks, embodiments of the invention may be implemented using any type of persistent storage device.

Figure 1:
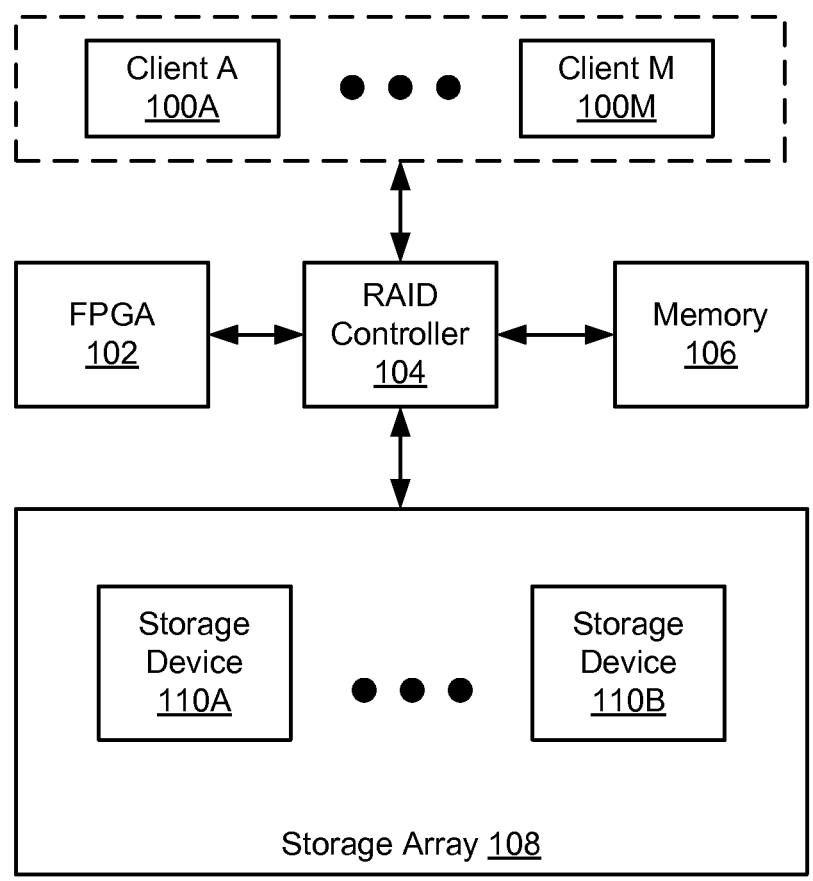
FIG. 1 shows a system in accordance with one embodiment of the invention.

FIG. 1 shows a system in accordance with one embodiment of the invention. As shown in FIG. 1, the system includes one or more clients (100A, 100M), a RAID controller (104), memory (106), optionally a Field Programmable Gate Array (FPGA) (102), and a storage array (108).

In one embodiment of the invention, a client (100A, 100M) is any system or process executing on a system that includes functionality to issue a read request or a write request to the RAID controller (104). In one embodiment of the invention, the clients (100A, 100M) may each include a processor (not shown), memory (not shown), and persistent storage (not shown). In one embodiment of the invention, the RAID controller (104) is configured to implement a RAID scheme, which includes writing data to the storage array (108) in a manner consistent with embodiments described in FIGS. 4-6, and performing garbage collection operations in accordance with embodiments described in FIG. 7 and FIGS. 9A-9B. Further, the RAID controller includes functionality to read data (including reconstructing data) from the storage array (108). In one embodiment of the invention, the RAID controller (104) includes a processor configured to execute instructions to implement one or more embodiments of the invention, where the instructions are stored on a non-transitory computer readable medium (not shown) that is located within or that is operatively connected to the RAID controller (104). Alternatively, the RAID controller (104) may be implemented using hardware. Those skilled in the art will appreciate that the RAID controller (104) may be implemented using any combination of software and/or hardware.

In one embodiment of the invention, the RAID controller (104) is operatively connected to memory (106). The memory (106) may be any volatile memory including, but not limited to, Dynamic Random-Access Memory (DRAM), Synchronous DRAM, SDR SDRAM, and DDR SDRAM. In one embodiment of the invention, the memory (106) is configured to temporarily store various data (including parity data) prior to such data being stored in the storage array.

In one embodiment of the invention, the FPGA (102) (if present) includes functionality to calculate parity values (e.g., P parity value, Q parity value) for purposes of storing data in the storage array (108) and/or functionality to perform various calculations necessary to recover corrupted data stored using the RAID scheme. The RAID controller (104) may use the FPGA (102) to offload the processing of various data in accordance with one or more embodiments of the invention.

In one embodiment of the invention, the storage array (108) includes one or more storage devices (SDDs) (110A, 110B). Each storage device includes persistent storage media. Examples of storage devices include, but are not limited to, magnetic memory devices, optical memory devices, phase change memory devices, solid state memory devices, tape drives, any other suitable type of persistent memory device, or any combination thereof.

Those skilled in the art will appreciate that while FIG. 1 shows an FPGA, the invention may be implemented without an FPGA. Further, those skilled in the art will appreciate that other components may be used in place of the FPGA without departing from the invention. For example, the invention may be implemented using an Application Specific Integrated Circuit(s) (ASIC), a graphics processing unit(s) (GPU), a general purpose processor(s), any other hardware device capable of calculating parity values for purposes of storing data in the storage array and/or performing various calculations necessary to recover corrupted data stored using the RAID scheme, any device that includes a combination of hardware, firmware, and/or software configured to calculate parity values for purposes of storing data in the storage array (108) and/or to perform various calculations necessary to recover corrupted data stored using the RAID scheme, or any combination thereof.

Those skilled in the art will appreciate that the invention is not limited to the configuration shown in FIG. 1.

Figure 2:
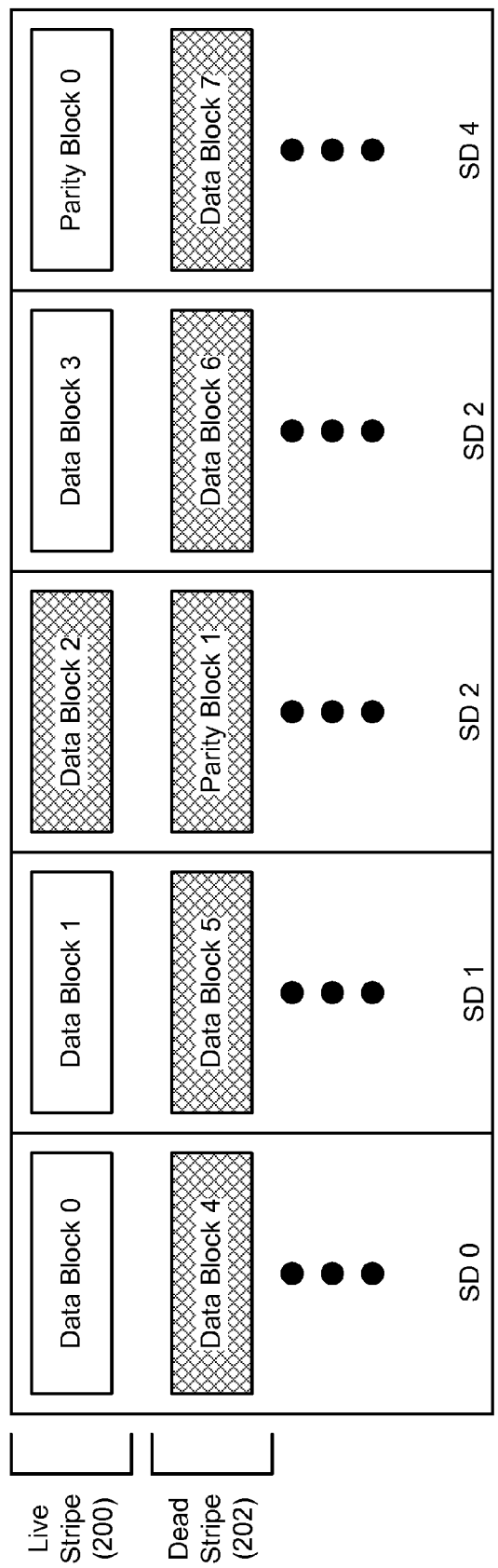
FIG. 2 shows RAID stripes in accordance with one or more embodiments of the invention.

FIG. 2 shows RAID stripes in accordance with one or more embodiments of the invention. Each RAID stripe includes data blocks and parity blocks. A data block corresponds to a portion of a RAID stripe that is located on a storage device that includes data (as opposed to parity values). A parity block corresponds to a portion of the RAID stripe that is located on a storage device that includes a parity value (or one of the parity values) for the RAID stripe. Each RAID stripe includes data blocks and one or more parity blocks. The size of each data block and each parity block is the same within a given RAID stripe. For example, for a given RAID stripe, each data block and each parity block may be 512 bytes.

In one embodiment of the invention, each block (i.e., data blocks and parity blocks) may be a dead block or a live block. A dead block is a block that only includes stale data or data that is otherwise marked to be erased. Data may be considered stale when an updated copy of the data is stored in another live block in the storage array. The data in the dead block is not used to service read requests. In one embodiment of the invention, a live block is a block that includes at least some data that is actively being used by clients and/or the storage controller. The data in the live block is used to service read requests.

Each RAID stripe in the system is either a live stripe (200) or a dead stripe (202). A RAID stripe is a dead stripe if it includes only dead blocks (e.g., data blocks 4-7 and parity block 1). A RAID stripe in the storage array is a live stripe (200) if it includes at least one live block.

As shown in FIG. 2, the RAID stripes (200, 202) include data blocks and parity blocks. The number of data blocks and parity blocks may vary based upon the RAID scheme used to generate the RAID stripes. For example, if the RAID stripe is generated in accordance with RAID-5, then the RAID stripe may include four data blocks and one parity block. In another example, if the RAID stripe is generated in accordance with RAID-6, then the RAID stripe may include four data blocks and two parity blocks (e.g., a parity block with a P parity value and a second parity block with a Q parity value).

In one embodiment of the invention, the P parity value is a Reed-Solomon syndrome that is generated using a P parity function. The P Parity function may correspond to any function that can generate a Reed-Solomon syndrome. In one embodiment of the invention, the P parity function is an XOR function.

In one embodiment of the invention, the Q parity value is a Reed-Solomon syndrome that is generated using a Q parity function. The Q Parity function may correspond to any function that can generate a Reed-Solomon syndrome. In one embodiment of the invention, a Q parity value is a Reed-Solomon code. In one embodiment of the invention, $Q=g^0 \cdot D_0 + g_1 \cdot D_{1+} g_2 \cdot D_{2+} \ldots + g^{n-1} \cdot D_{n-1}$, where Q corresponds to any one of the Q parity values described in the invention, g is a generator of the field, and the value of D corresponds to the data (stored in the data blocks in the corresponding RAID stripe).

In one embodiment of the invention, the RAID stripe geometry defines the location of each of the blocks in a RAID stripe. For example, referring to live stripe (200), the RAID geometry may specify the following: (i) RAID scheme—RAID 5, and (ii) that the parity block is located on SD 4. Similarly, for the dead stripe (202), the RAID geometry may specify the following: (i) RAID scheme—RAID 5 and (ii) that the parity block is located on SD 2. Depending on the specific implementation of the SD, the RAID stripe geometry may also include the location of the specific block within the SD that corresponds to the parity block.

Using this information, the storage controller (or another component in the system) may determine the location of the data blocks in the storage array for the live stripe (200) and dead stripe (202). The stripe geometry may include additional information (e.g., data block locations) and/or information specified in a different manner without departing from the invention.

In one embodiment of the invention, each block in the RAID stripe is located on a different SD. Further, the width of each RAID stripe in the storage array may be the same and span the entire storage array (e.g., 5 SDs in FIG. 2).

Embodiments of the invention may be implemented using different RAID schemes (e.g., RAID-4, RAID-5, RAID-6, multi-dimensional RAID, etc.) and different stripe widths without departing from the invention. Further, a given storage array may concurrently have stored therein RAID stripes of different widths stored using different RAID schemes.

Figure 3:
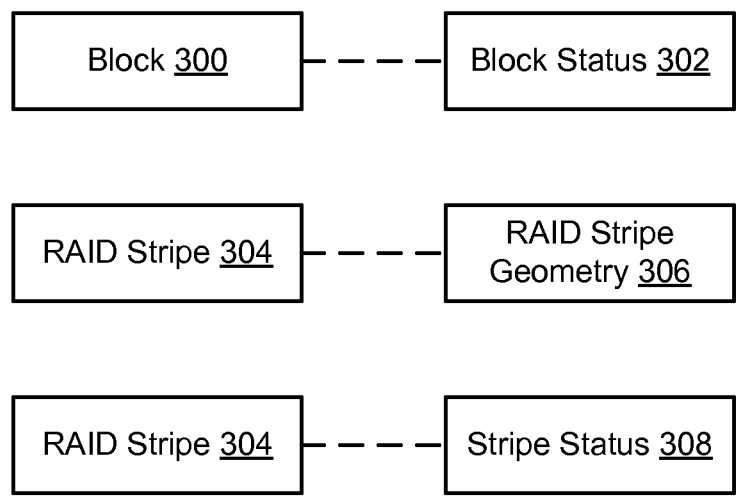
FIG. 3 shows data structures in accordance with one embodiment of the invention.

FIG. 3 shows data structures in accordance with one embodiment of the invention. In one embodiment of the invention, the RAID controller includes one or more data structures to implement embodiments of the invention.

In one embodiment of the invention, a block status (302) is maintained for each block (300) in the storage array. The block status (302) indicates whether the block is a live block or a dead block. In one embodiment of the invention, a RAID stripe geometry (306) is maintained for each RAID stripe (304) stored in the storage array. Further, a stripe status (308), which indicates whether the RAID stripe (304) is a live stripe or a dead stripe, is maintained for each RAID stripe (304).

Turning to the flowcharts, while the various steps in the flowchart are presented and described sequentially, one of ordinary skill will appreciate that some or all of the steps may be executed in different orders, may be combined or omitted, and some or all of the steps may be executed in parallel. In one embodiment of the invention, one or more steps shown in FIGS. 4-7 and 9A-9B may be performed in parallel with one or more of the other steps shown in FIGS. 4-7 and 9A-9B.

Figure 4:
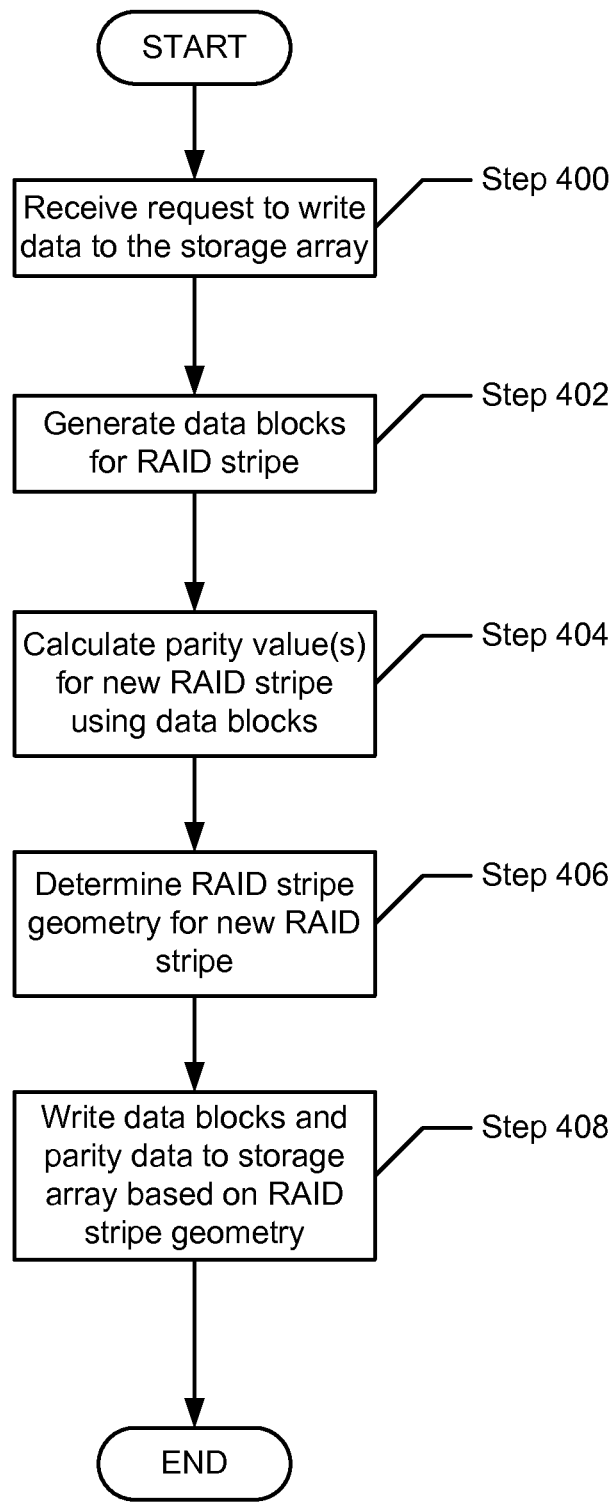
FIG. 4 shows a flowchart implementing a RAID write operation in accordance with one or more embodiments of the invention.

FIG. 4 shows a flowchart implementing a RAID write operation in accordance with one or more embodiments of the invention. More specifically, FIG. 4 shows normal RAID write operations prior to a target SD being identified (see FIG. 6).

In Step 400, a request to write data to the storage array is received. The request may include the data to be stored or may include a reference to the data to be stored. The request may take any form without departing from the invention. In Step 402, data blocks are generated to store in a RAID stripe (see e.g., FIG. 2). A data block corresponds to a portion of the data that is to be stored in the storage array. The number of data blocks for the RAID stripe is based on the RAID scheme upon which the RAID stripe is based. In Step 404, one or more parity values for the new RAID stripe are calculated using the data blocks. The number of parity values depends on the RAID scheme upon which the RAID stripe is based. For example, if the RAID stripe is generated based on RAID-6, then there are two parity values calculated: P parity value and a Q parity value. The result of Step 404 is a set of parity blocks. In Step 406, the RAID stripe geometry (see FIG. 2) is determined for the RAID stripe. The RAID stripe geometry may correspond to any RAID stripe geometry. Specifically, the parity value(s) may be placed on any SD in the storage array. In Step 408, the data blocks and parity blocks are written to the storage array as a RAID stripe in accordance with the RAID stripe geometry (determined in Step 406).

Concurrently with the execution of the process shown in FIG. 4, the storage controller may also be performing garbage collection operations. In general, garbage collection operations include (i) identifying live RAID stripes that have zero or more dead data blocks, (ii) generating new RAID stripes using only live data blocks from RAID stripe identified in (i), (iii) writing the new RAID stripes to available locations in the storage array, and (iv) erasing or otherwise reclaiming all locations in the storage array that include dead RAID stripes or RAID stripes identified in (i). In one embodiment of the invention, the garbage collection operations may also include (i) identifying live RAID stripes that have at least one dead data block, (ii) generating new RAID stripes for each RAID stripe identified in (i) that include at least one dead data block, (iii) writing the new RAID stripes to available locations in the storage array, and (iv) erasing or otherwise reclaiming all locations in the storage array that include RAID stripes identified in (i).

FIGS. 5-7 and 9A-9B show flowcharts directed to the operation of the storage controller after a target SD is identified.

Figure 5:
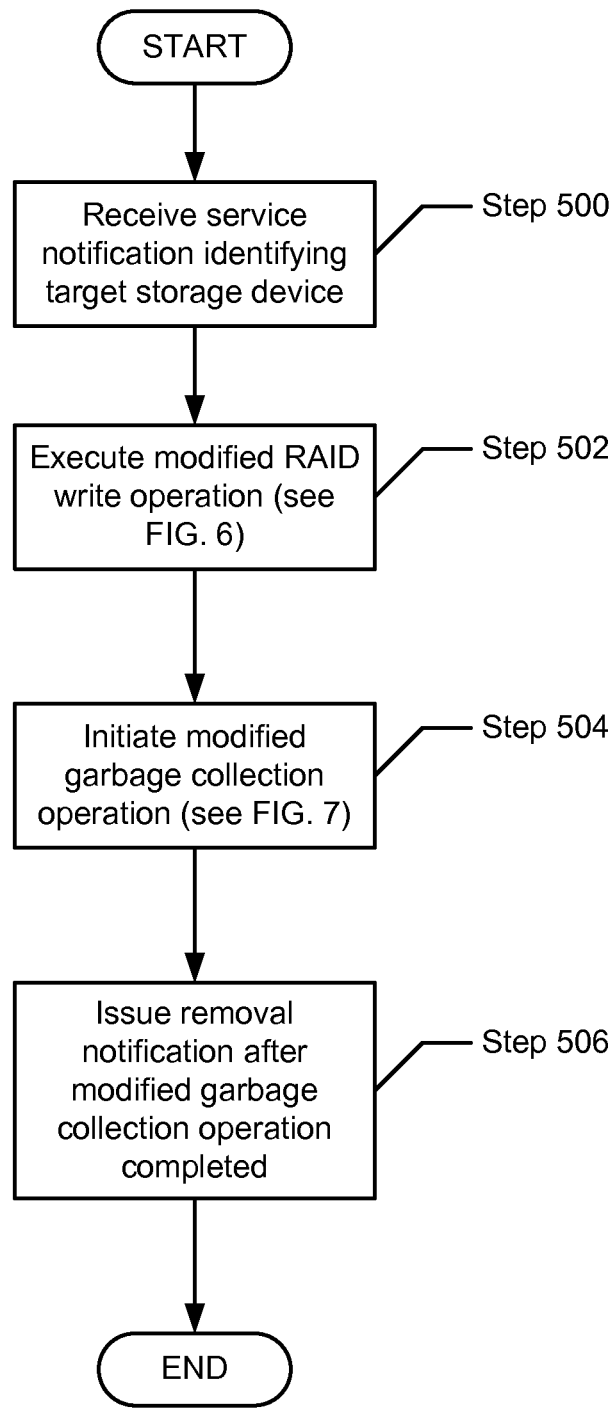
FIG. 5 shows a flowchart for implementing service-aware parity placement in accordance with one or more embodiments of the invention.

Turning to FIG. 5, FIG. 5 shows a flowchart for implementing service-aware parity placement in accordance with one or more embodiments of the invention. In Step 500, a service notification request identifying a target SD is received. The target SD corresponds to an SD in the storage array that (i) is scheduled to be replaced based on an SD service schedule (e.g., each SD is replaced after they have been in service for a certain period of time), (ii) is to be replaced based upon input from a user (e.g., system administrator), or (iii) is experiencing error events (e.g., failed write operations, failed read operations, etc.) that are above an error event threshold. The error event threshold may be set based upon (a) user input, (b) default values, and/or (c) historical information about the storage array and/or the SD. The service notification may be issued and/or received by the storage controller based on items (i), (ii) and/or (iii) listed above. Alternatively, the storage controller may perform the remainder of the steps based on items (i), (ii) and/or (iii) listed above, without receiving a service notification. In another embodiment of the invention, one process (or set of processes) executing in the storage controller may, based on items (i), (ii) and/or (iii), generate a service notification, which is then received by the process (or set of processes) in the storage controller executing the steps in FIG. 5.

Figure 6:
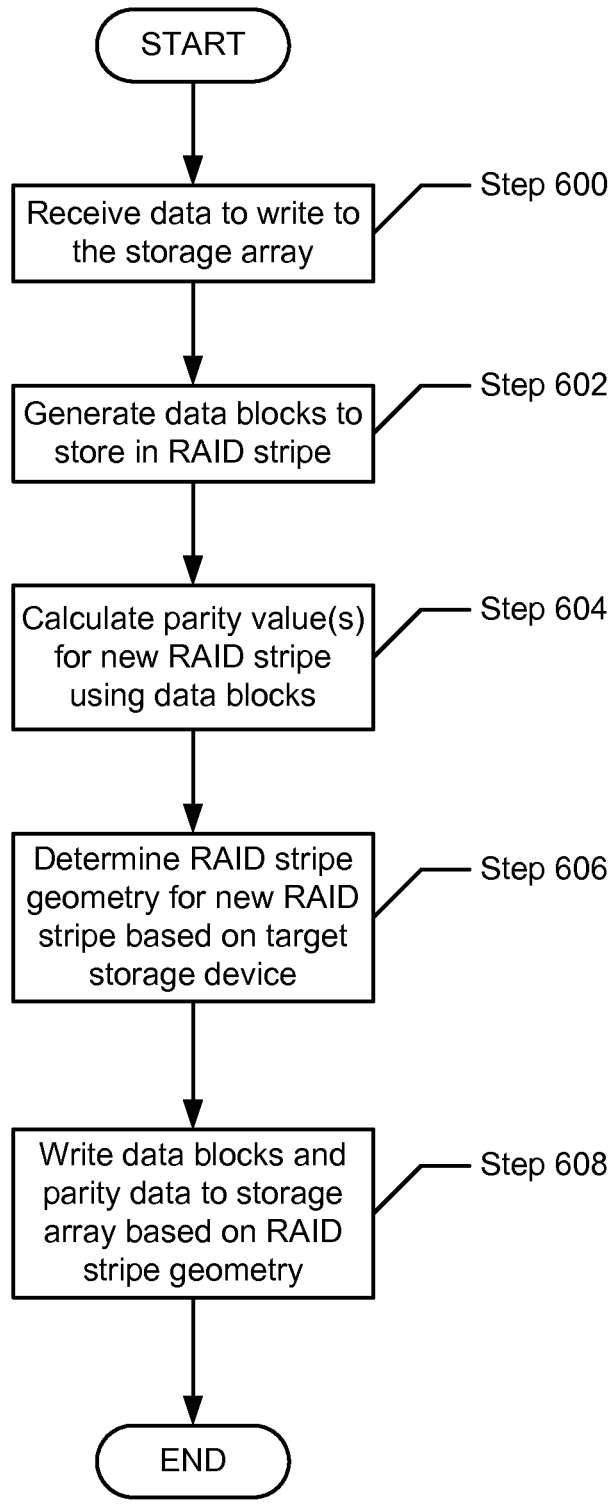
FIG. 6 shows a flowchart for implementing the modified RAID writes operation in accordance with one or more embodiments of the invention.

In Step 502, the modified RAID operation is executed (see FIG. 6). The modified RAID operation is only performed when a write request is received between Step 500 (or after the target SD is identified) and the issuance of the removal notification in Step 506. In Step 504, the modified garbage collection operation is performed (see FIG. 7 and FIGS. 9A-9B). In one embodiment of the invention, the modified garbage collection operation is always performed while the modified RAID operation is only performed when a write request is received. As such, if no write requests are received between steps 500 and the completion of the modified garbage collection operation, then step 502 is not performed. As discussed above, steps 502 and 504 may be performed concurrently. In Step 506, once the modified garbage collection operation is completed, the storage controller (or a process executing thereon) may issue a removal notification indicating that the target SD may be physically removed from the storage array. After step 506, the storage controller services write requests in accordance with FIG. 4 and performs garbage collection operations (and not the modified garbage collection operation) as described above until another target SD is identified.

FIG. 6 shows a flowchart for the implementing the modified RAID write operation in accordance with one or more embodiments of the invention.

In Step 600, a request to write data to the storage array is received. The request may include the data to be stored or may include a reference to the data to be stored. The request may take any form without departing from the invention. In Step 602, data blocks are generated to store as part of a RAID stripe (see e.g., FIG. 2). A data block corresponds to a portion of the data that is to be stored in the storage array. The number of data blocks is based on the number of data blocks that are in the RAID stripe. In Step 604, one or more parity values for the new RAID stripe are calculated using the data blocks. The number of parity values depends on the RAID scheme upon which the RAID stripe is based. For example, if the RAID stripe is generated based on RAID-6, then there are two parity values calculated: P parity value and a Q parity value. The result of Step 704 is one or more parity blocks. In Step 606, the RAID stripe geometry (see FIG. 2) is determined for the new RAID stripe. The RAID stripe geometry may correspond to any RAID stripe geometry that (i) places the parity block of the new RAID stripe on the target SD if the new RAID stripe only has one parity value and (ii) places one of the parity values for the new RAID stripe in a parity block on the target SD if the RAID stripe includes multiple parity values (e.g., the new RAID stripe is implemented in accordance with RAID-6). In the event that there are multiple parity values, the parity value that would result in the highest relative computational expense related to data reconstruction is placed on the target SD. For example, if the new RAID stripe included a P parity value and Q parity value, the Q parity value is placed on the target SD because it is more computationally expensive to regenerate data in the RAID stripe using the Q parity value as compared with the P parity value.

Continuing with the discussion of FIG. 6, in Step 608, the data blocks and parity blocks are written as RAID stripe to the storage array in accordance with the RAID stripe geometry (determined in Step 606).

Figure 7:
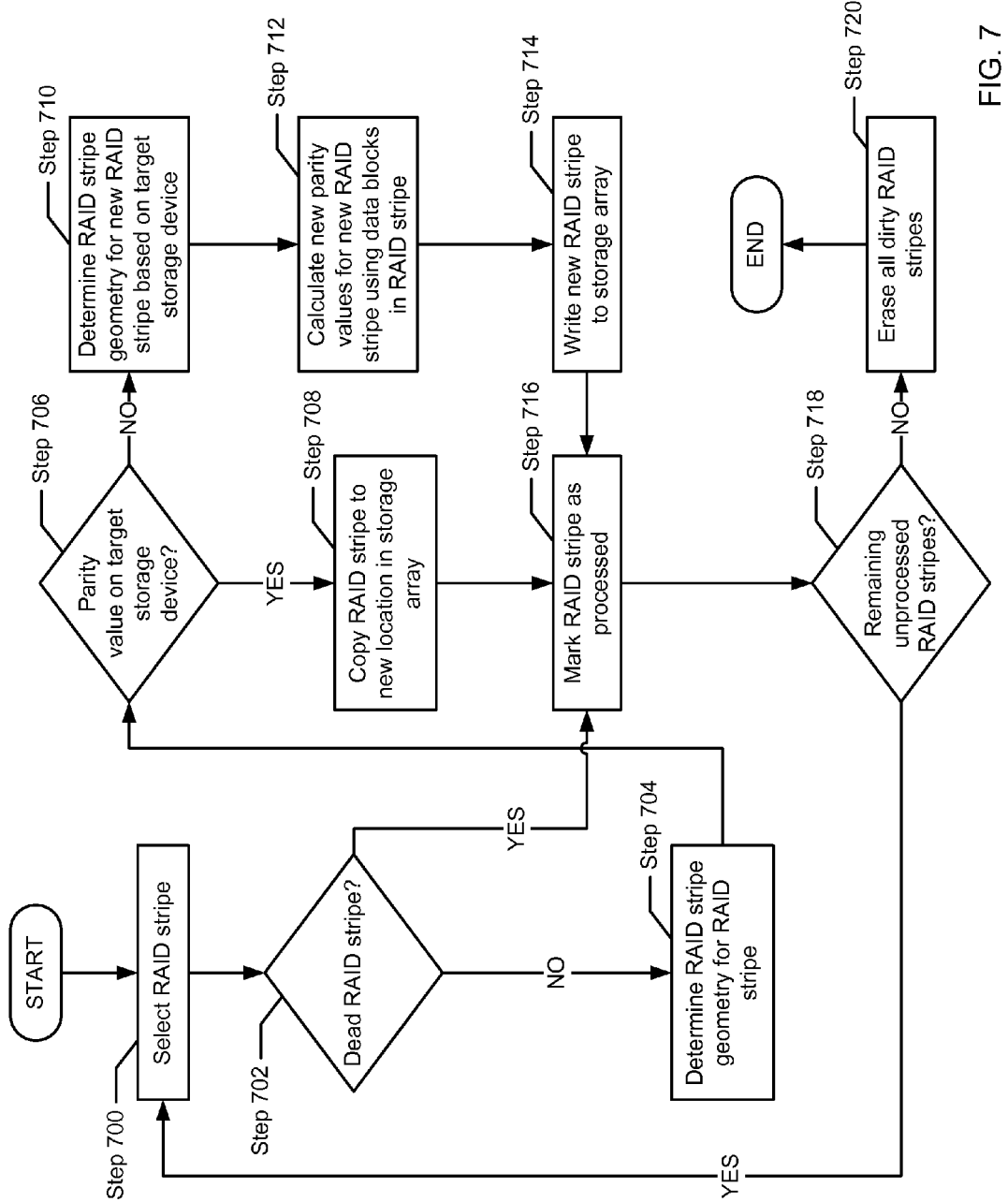
FIG. 7 shows a flowchart for implementing a modified garbage collection operation in accordance with one or more embodiments of the invention.

FIG. 7 shows a flowchart for implementing a modified garbage collection operation in accordance with one or more embodiments of the invention.

In Step 700, a RAID stripe is selected. The RAID stripe may be any RAID stripe in the storage array that is present at the time the modified garbage collection operation is initiated. The process described in FIG. 7 is not performed on RAID stripes that are written to the storage array (as part of the modified garbage collection operation or as part of the modified RAID write operation (see FIG. 6)) after the modified garbage collection operation is initiated.

In Step 702, a determination is made about whether the selected RAID stripe is a dead stripe. If the selected RAID stripe is a dead stripe, then the process proceeds to step 716; otherwise, the process proceeds to step 704.

In Step 704, the RAID stripe geometry for the selected RAID stripe is determined, for example, using the data structure(s) described in FIG. 3.

In Step 706, a determination is made about whether the parity value for the RAID stripe is located on the target SD (identified in FIG. 5, Step 500). If the parity value for the RAID stripe is located on the target SD, the process proceeds to Step 708; otherwise, the process proceeds to Step 710.

In one embodiment of the invention, if the RAID stripe includes multiple parity values, then Step 706 may also include determining not only if a parity block is located on the target SD, but also whether the parity value in the parity block on the target SD corresponds to the parity value that would result in the highest relative computational expense related to data reconstruction (e.g., if the RAID stripe includes a P parity value and Q parity value, then a determination is made about whether the Q parity value is stored in the parity block located on the target SD). If the parity block includes the parity value that would result in the highest relative computational expense related to data reconstruction, then the process proceeds to Step 708; otherwise, the process proceeds to step 710.

In Step 708, a copy of the RAID stripe is stored in a new location in the storage array. Specifically, the copy of the RAID stripe includes copies of the data in the data blocks of the RAID stripe and a copy(ies) of the parity value from the parity block(s) in the RAID stripe. In one embodiment of the invention, instead of creating a copy of the RAID stripe, the data from the RAID stripe is obtained and a new RAID stripe is generated by (i) dividing the data in to new data blocks, (ii) calculating a new parity value(s) based on (i) and creating parity blocks using the parity values; (iii) storing the data blocks and the parity value as a RAID stripe in the storage array in accordance with the RAID stripe geometry of the RAID stripe identified in Step 700. The process then proceeds to Step 716.

In Step 710, a new RAID stripe geometry is generated for the selected RAID stripe in which the parity block (if there is only a single parity block in the RAID stripe) or the parity block with the parity value that would result in the highest relative computational expense related to data reconstruction (if there are multiple parity blocks in the RAID stripe) is to be stored in the target SD.

In Step 712, a new parity value(s) is calculated for the parity block(s) using the data blocks (which may correspond to the data blocks in the data blocks of the RAID stripe (selected in Step 700) or may be new generated data blocks based on the data in the RAID Stripe (selected in Step 700)) that are to be stored in the data blocks for the new RAID stripe. Depending on the RAID scheme being implemented, the parity values may not be recalculated; rather, the same parity value(s) that was present in the parity block(s) is used in the new RAID stripe (i.e., the RAID stripe that is written to the storage array in Step 714).

In Step 714, the data blocks and the parity block(s) (which include the parity value(s)) are written as a RAID stripe in the storage array in accordance with the RAID stripe geometry determined in Step 710. The process then proceeds to Step 716.

In Step 716, the RAID stripe (selected in Step 700) is marked as processed. In Step 718, a determination is made about whether there are remaining RAID stripes to process in the storage array. If there are remaining RAID stripes to process in the storage array, the process proceeds step 700; otherwise, the process proceeds to Step 720.

In Step 720, all RAID stripes that existed in the storage array prior to the initiation of the modified garbage collection operation have been processed and, accordingly, all processed RAID stripes are erased. Once all processed RAID stripes are erased, a removal notification may be issued, which indicates that the target SD may be removed. The removal notification may be sent to a user (e.g., a system administrator) indicating that the target SD may be removed from the storage array. Though not required, all dead blocks may also be erased with the processed RAID stripes are being erased.

In one embodiment of the invention, the result of the process in FIG. 7 places at least one parity block for each RAID stripe on the target SD and moves all data blocks from the target SD to other SDs in the storage array.

Figure 8A:
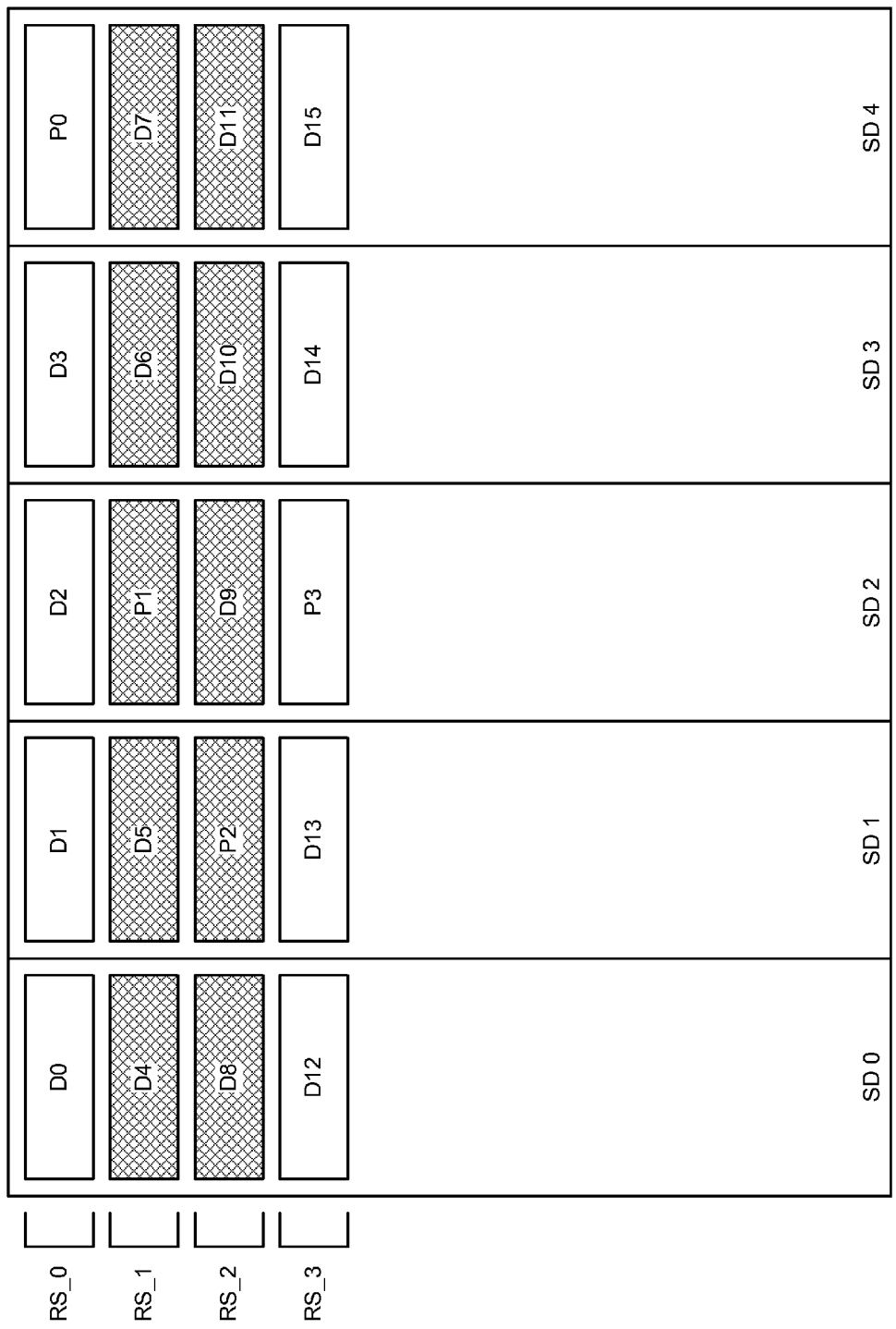
FIGS. 8A-8C show an example in accordance with one or more embodiments of the invention.
Figure 8B:
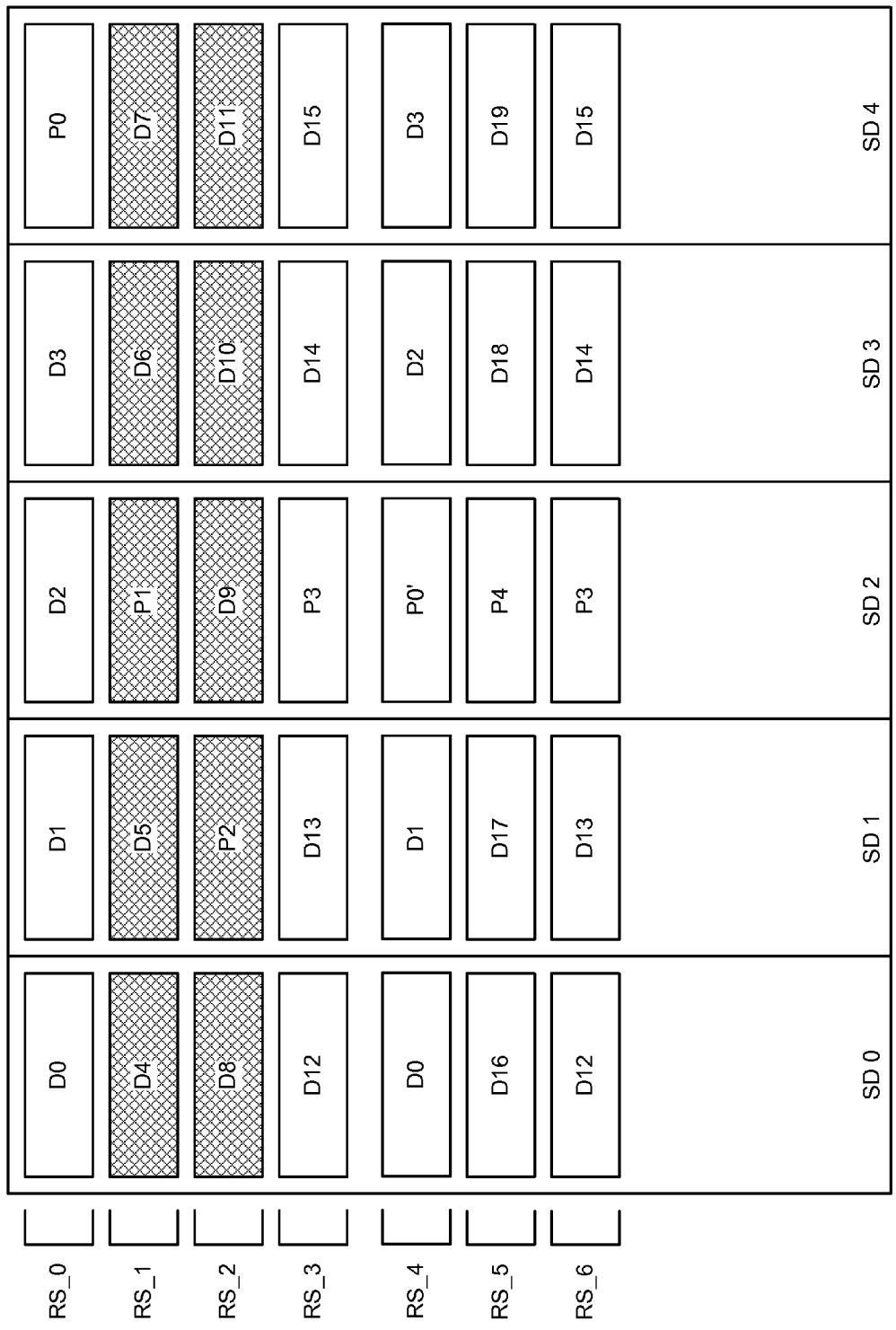
Figure 8C:
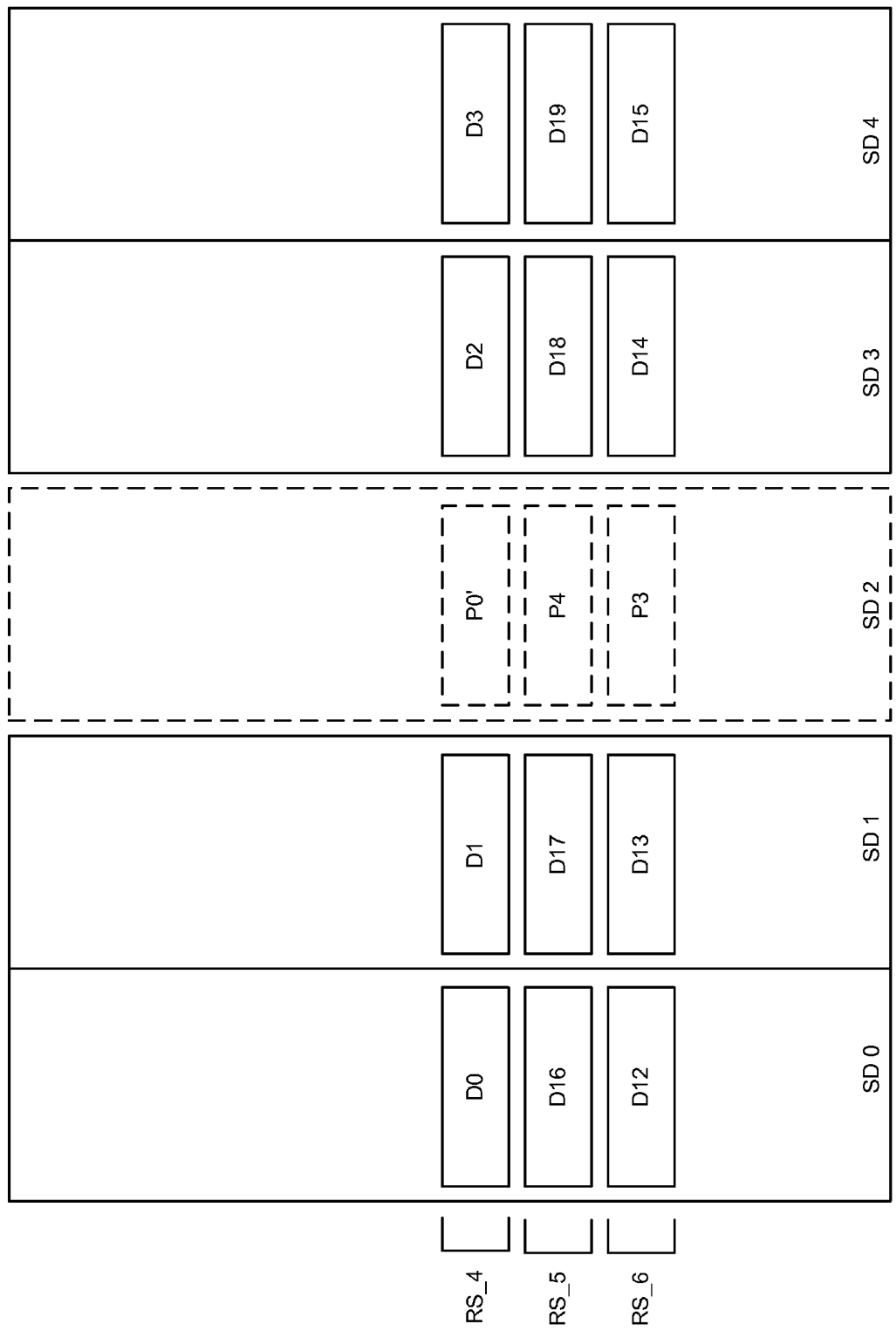

FIGS. 8A-8C show an example in accordance with one or more embodiments of the invention. The example is not intended to limit the scope of the invention.

Turning to FIG. 8A, consider a scenario in which the storage array has five storage devices (SD0-SD4) and that a service notification has been received which indicates that SD2 needs to be removed. FIG. 8A shows the state of the storage array at the time the modified garbage collection operation is initiated.

At this stage, the storage controller initiates the modified garbage collection operation as described in FIG. 7. Specifically, referring to FIG. 8B, RAID Stripe RS_0 is identified as a live RAID stripe that has a RAID stripe geometry in which its parity block (P0) is not located on the target SD (i.e., SD2). Accordingly, a new RAID stripe is generated (RS_4) that includes the same data blocks as RAID Stripe RS_0 but has a newly calculated parity block (P0') and a RAID stripe geometry that places the parity block (P0') on SD2. As shown in FIG. 8B, RAID Stripe RS_4 is written to a new location in the storage array.

RAID Stripes RS_1 and RS_2 are processed next and, per FIG. 7, no action is taken with respect to these RAID stripes as they are dead stripes. While the modified garbage collection operation is being performed, the storage controller (not shown) receives a request to write new data as a RAID stripe to the storage array. The new data is written to the storage array in accordance with FIG. 6 (Step 606), where the RAID stripe geometry specifies that the parity block (P4) is to be located on the target SD. RAID Stripe RS_5 is subsequently written to the storage array.

Finally, RAID Stripe RS_3 is processed in accordance with FIG. 7. Because the RAID stripe geometry of RAID Stripe RS_3 places the parity block (P3) on the target SD, the blocks that make up RAID Stripe RS_3 may be copied and stored as a new RAID stripe (RS_6) in the storage array. At this stage, all RAID stripes that existed in the storage array at the time the modified garbage collection operation was initiated have been processed. Accordingly, referring to FIG. 8C, all processed RAID stripes (i.e., RAID Stripes RS_0-RS_3) are erased and SD 2 may be removed. SD 2 may be removed prior to the dead blocks being erased without departing from the invention.

Figure 9A:
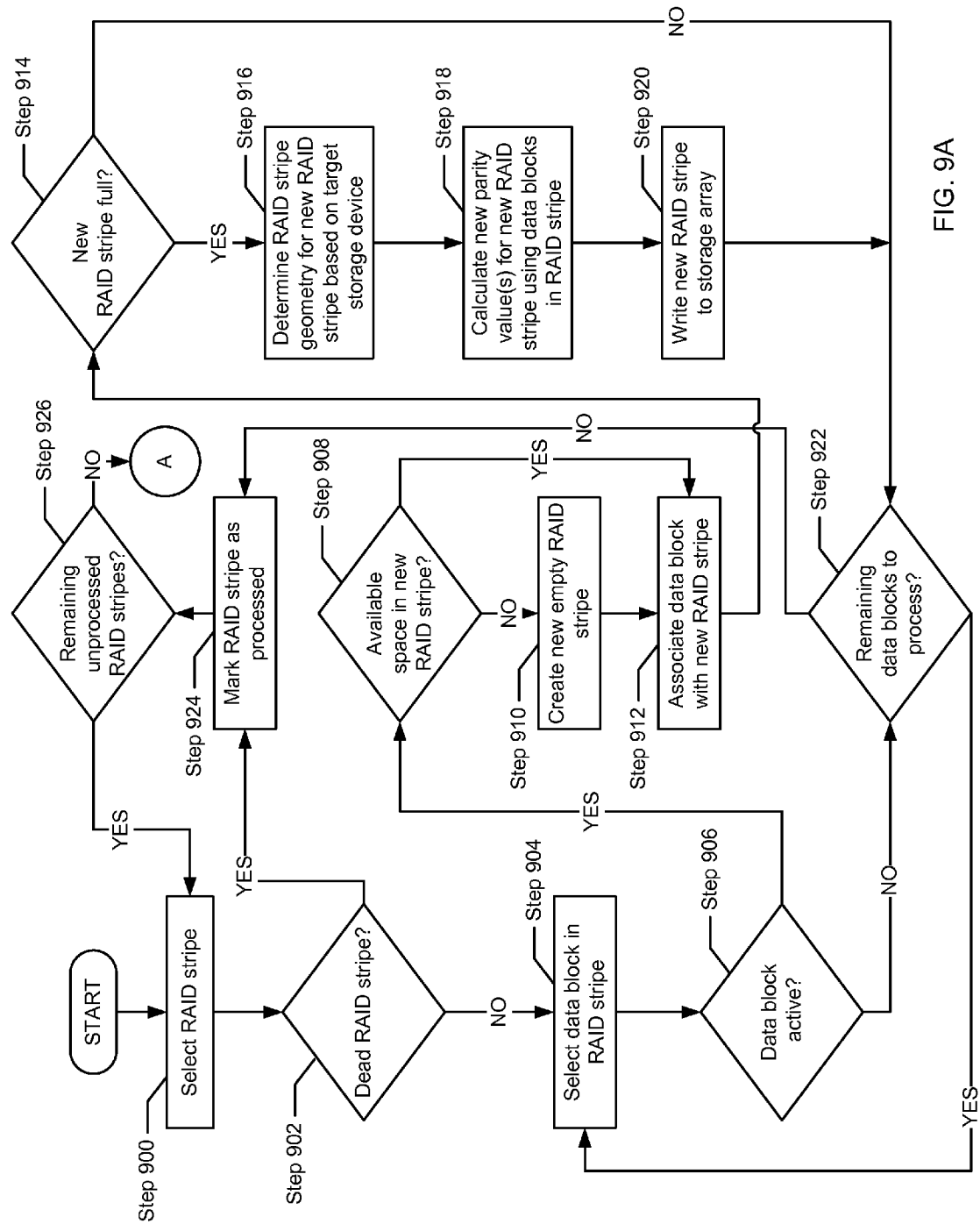
FIGS. 9A-9B show flowcharts for implementing a modified garbage collection operation in accordance with one or more embodiments of the invention.
Figure 9B:
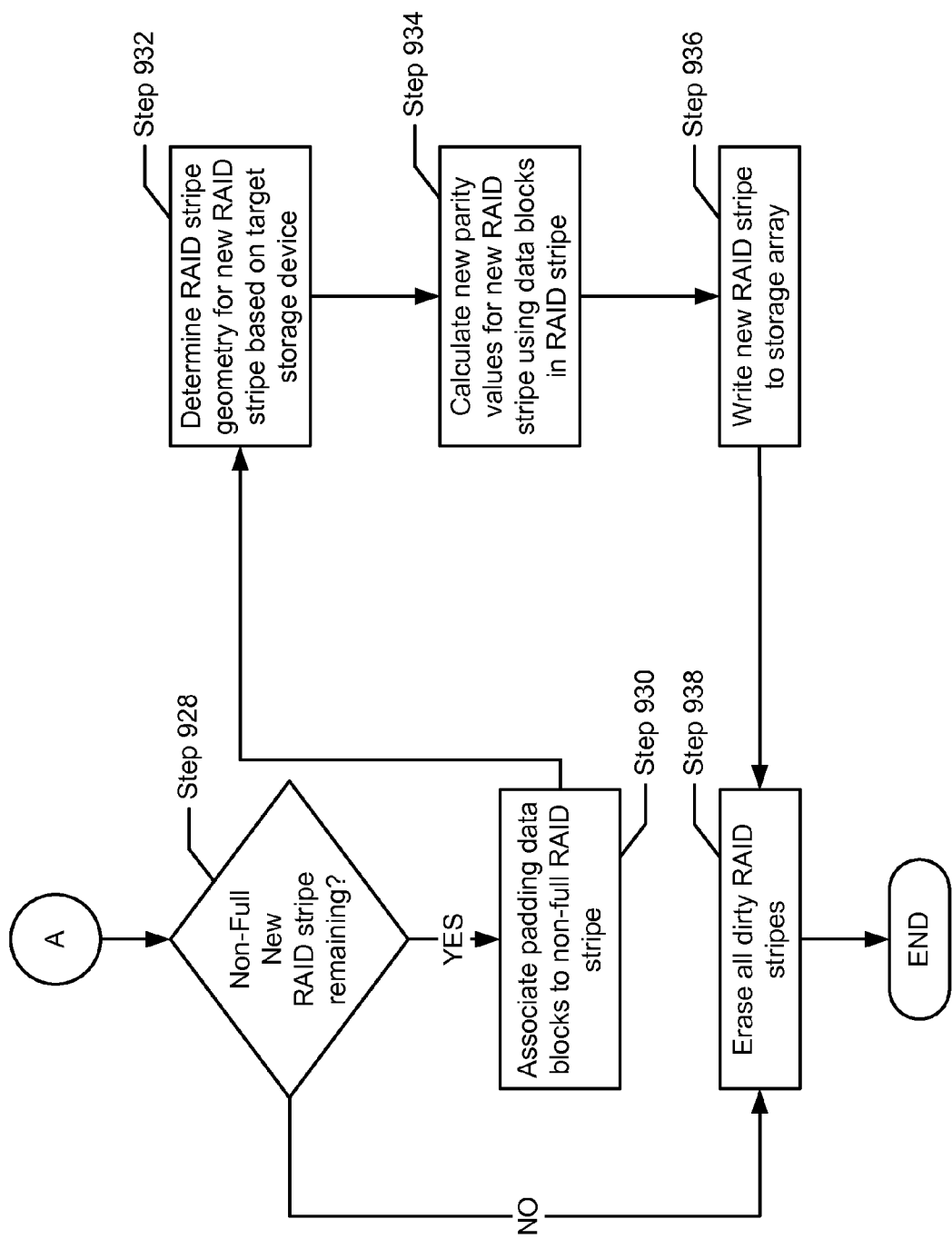

FIGS. 9A-9B show flowcharts for implementing a modified garbage collection operation in accordance with one or more embodiments of the invention.

In Step 900, a RAID stripe is selected. The RAID stripe may be any RAID stripe in the storage array that is present at the time the modified garbage collection operation is initiated. The process described in FIG. 9A-9B is not performed on RAID stripes that are written to the storage array (as part of the modified garbage collection operation or as part of the modified RAID write operation (see FIG. 6)) after the modified garbage collection operation is initiated.

In Step 902, a determination is made about whether the selected RAID stripe is a dead stripe. If the selected RAID stripe is a dead stripe, then the process proceeds to step 724; otherwise, the process proceeds to step 904. In Step 904, a data block in the RAID stripe is selected. In Step 906, a determination is made about whether the selected data block is live. If the selected data block is live, the process proceeds to Step 908; otherwise, the process proceeds to Step 922.

In Step 908, a determination is made about whether there is space available to store the selected data block in the new RAID stripe. Said another way, a determination is made about whether there is a new RAID stripe that is currently being filled with data blocks as part of the modified garbage collection operation (see e.g., FIG. 10A-10B). If there is space available to store the selected data block in the new RAID stripe, the process proceeds to Step 912; otherwise, the process proceeds to Step 910. In one embodiment of the invention, the new RAID stripe is not full if there is less than N data blocks associated with the new RAID stripe, where the RAID stripe (when full) includes N data blocks and M parity blocks (where e.g., N≥4 and M≥1).

In Step 910, when there is no space available to store the selected data block in the new RAID stripe, a new RAID stripe is created. In one embodiment of the invention, at the time the new RAID stripe is created, the RAID stripe does not include any data blocks or parity blocks. In Step 912, the data block (selected in Step 904) is associated with a new RAID stripe (i.e., the empty new RAID stripe created in Step 910 or another new RAID stripe that includes at least one other data block and is not full at the time Step 908 is performed).

In Step 914, a determination is made about whether the new RAID stripe is full (i.e., is the new RAID stripe associated with N data blocks). If the new RAID stripe is full, the process proceeds to Step 916; otherwise, the process proceeds to Step 922.

In Step 916, a new RAID stripe geometry is determined for the selected RAID stripe in which the parity block (if there is only a single parity block in the RAID stripe) or the parity block with the parity value that would result in the highest relative computational expense related to data reconstruction (if there are multiple parity blocks in the RAID stripe) is to be stored in the target SD.

In Step 918, a new parity value(s) is calculated for the parity block(s) using the data blocks associated with the new RAID stripe. In Step 920, the data blocks and the parity block(s) (which include the parity value(s)) are written as a RAID stripe in the storage array in accordance with the RAID stripe geometry determined in Step 916. The process then proceeds to Step 922.

In Step 922, a determination is made about whether there are additional data blocks remaining to process in the selected RAID stripe. If there are additional data blocks remaining to process in the selected RAID stripe, the process proceeds to Step 904; otherwise, the process proceeds to Step 924.

In Step 924, the RAID stripe (selected in Step 900) is marked as processed. In Step 926, a determination is made about whether there are remaining RAID stripes to process in the storage array. If there are remaining RAID stripes to process in the storage array, the process proceeds step 900; otherwise, the process proceeds to Step 928.

In Step 928, a determination is made about whether there are any non-full new RAID stripes remaining. Said another way, a determination is made about whether there is a non-full RAID stripe that includes data blocks that need to be stored in the storage array. If there are any non-full new RAID stripes remaining, the process proceeds to Step 928; otherwise, the process proceeds to Step 938.

In Step 930, one or more padding data blocks are associated with the RAID Stripe (identified in Step 928) in order to have a total of N data blocks associated with the RAID Stripe. Padding data blocks are data blocks that include, e.g., all zeros, so as to not impact the parity value(s) generated using the non-padding data blocks in the RAID stripe In Step 932, a new RAID stripe geometry is determined for the selected RAID stripe (i.e., RAID stripe identified in Step 928) in which the parity block (if there is only a single parity block in the RAID stripe) or the parity block with the parity value that would result in the highest relative computational expense related to data reconstruction (if there are multiple parity blocks in the RAID stripe) is to be stored in the target SD.

In Step 934, a new parity value(s) is calculated for the parity block(s) using the data blocks associated with the new RAID stripe. In Step 936, the data blocks and the parity block(s) (which include the parity value(s)) are written as a RAID stripe in the storage array in accordance with the RAID stripe geometry determined in Step 932. The process then proceeds to Step 938.

In Step 938, all RAID stripes that existed in the storage array prior to the initiation of the modified garbage collection operation have been processed and, accordingly, all processed RAID stripes are erased. Once all processed RAID stripes are erased, a removal notification may be issued, which indicates that the target SD may be removed. The removal notification may be sent to a user (e.g., a system administrator) indicating that the target SD may be removed from the storage array. Though not required, all dead blocks may also be erased when the processed RAID stripes are being erased.

In one embodiment of the invention, the result of the process in FIG. 9A-9B places at least one parity block for each RAID stripe on the target SD and moves all data blocks from the target SD to other SDs in the storage array.

Figure 10A:
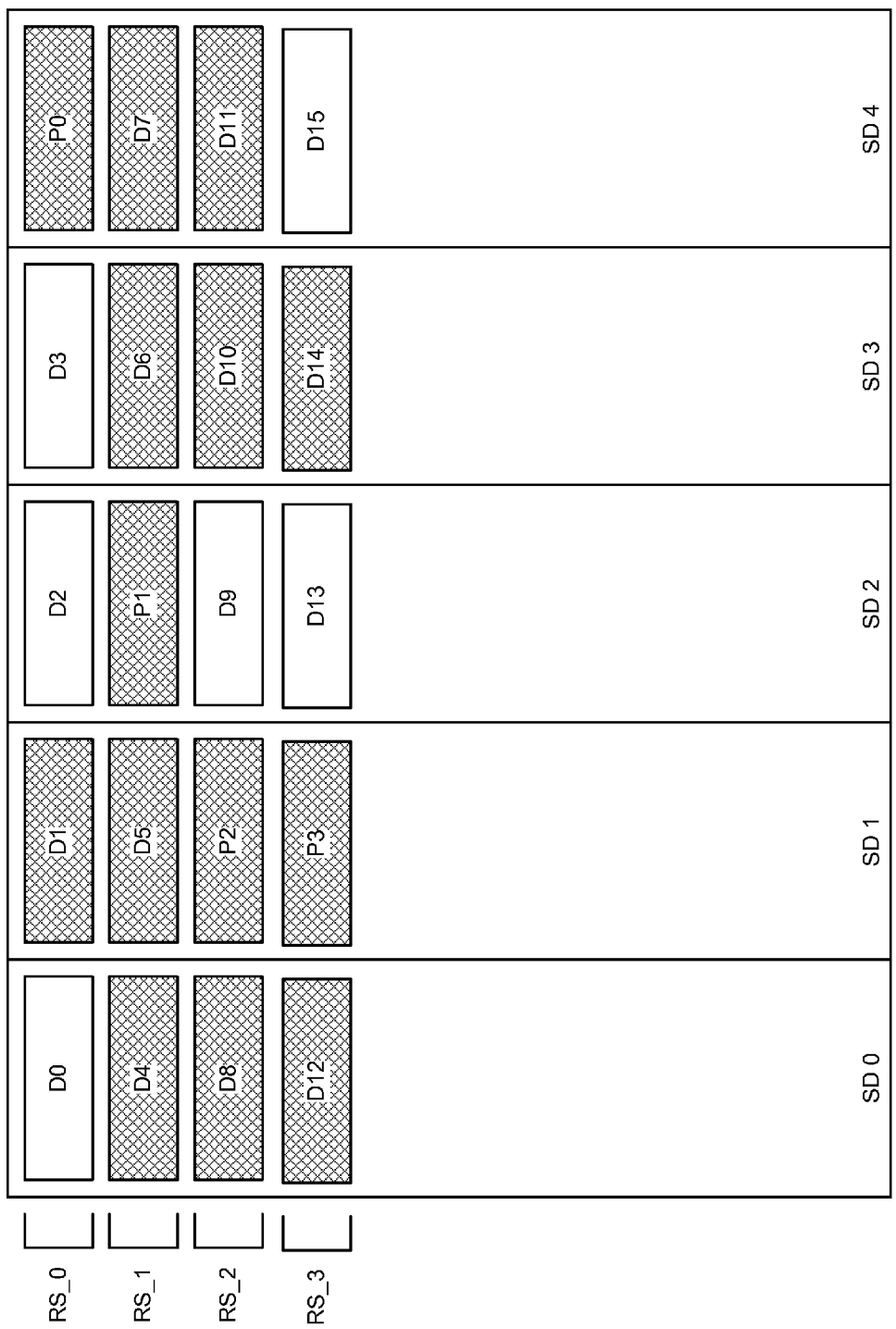
FIGS. 10A-10B show an example in accordance with one or more embodiments of the invention.
Figure 10B:
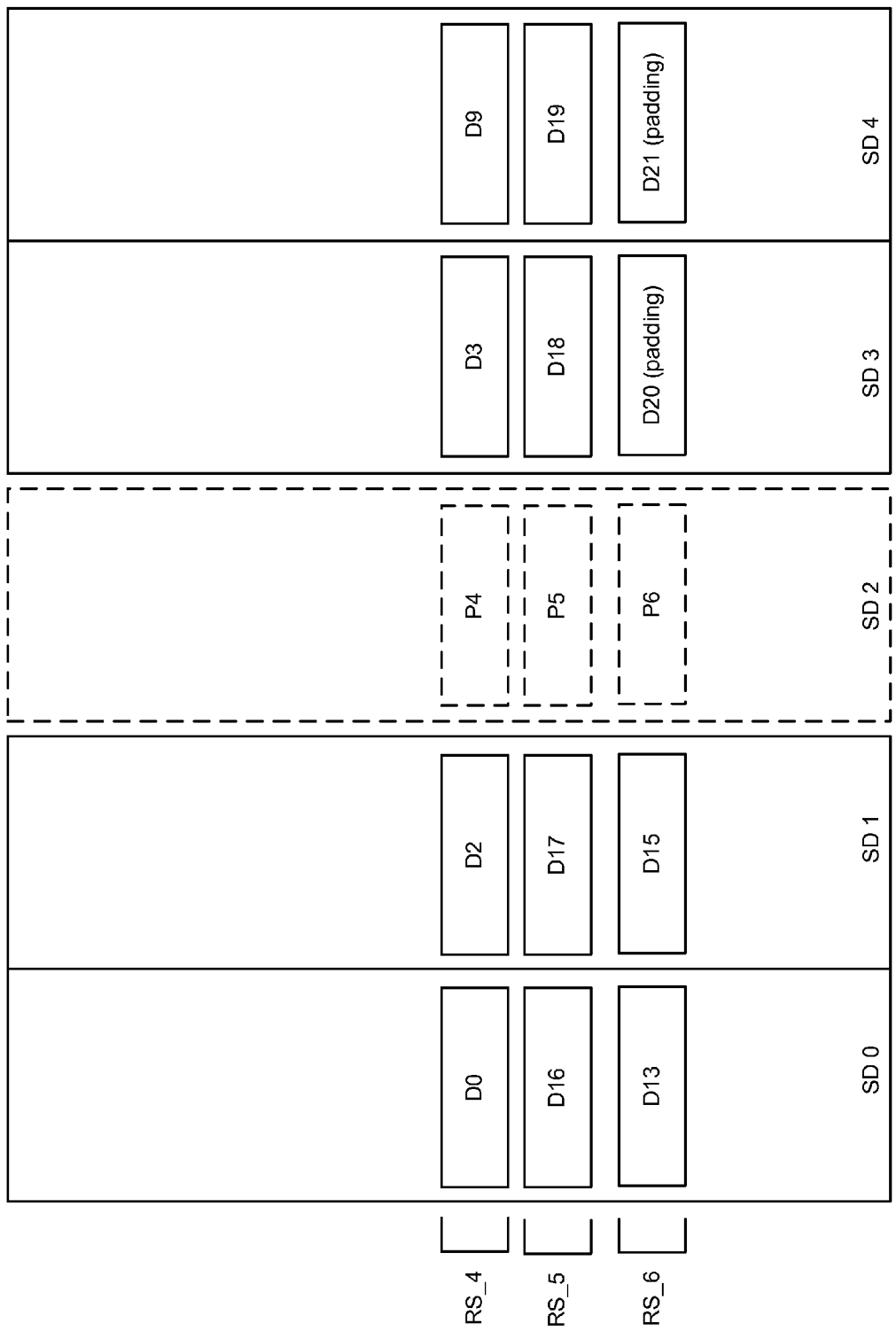

FIGS. 10A-10B show an example in accordance with one or more embodiments of the invention. The example is not intended to limit the scope of the invention.

Turning to FIG. 10A, consider a scenario in which the storage array has five storage devices (SD0-SD4) and that a service notification has been received which indicates that SD2 needs to be removed. FIG. 10A shows the state of the storage array at the time the modified garbage collection operation is initiated.

At this stage, the storage controller initiates the modified garbage collection operation as described in FIG. 9A-9B. Specifically, referring to FIG. 10A, RAID Stripe RS_0 is a live RAID stripe includes live data blocks D0, D2, and D3. RAID Stripe RS_1 is a dead stripe. RAID Stripe RS_2 is a live RAID stripe that includes live data block D9. Finally, RAID Stripe RS_3 is a live RAID stripe that includes live data blocks D13 and D15.

RAID Stripe RS_0 through RAID Stripe RS_3 are processed in accordance with FIGS. 9A-9B. Specifically, the live data blocks D0, D1, D3, and D9 are combined to form a new RAID stripe RS_4. (See FIG. 10B). Further, live data blocks D13 and D15 are combined to form a new RAID stripe RS_6; however, because each RAID stripe includes four data blocks, padding data blocks D20 and D21 need to be included in RS_6 in order for there to be four data blocks in RAID Stripe RS_6. (See FIG. 10B). With respect to RAID Stripe RS_1, no data blocks in RAID Stripe RS_1 are rewritten in any of the new RAID stripes as all data blocks in RAID Stripe RS_1 are dead.

In this example while the modified garbage collection operation is being performed (i.e., after RAID Stripe RS_4 has been written to the storage array), the storage controller (not shown) receives a request to write new data as a RAID stripe to the storage array. The new data is written to the storage array in accordance with FIG. 6 (Step 606), where the RAID stripe geometry specifies that the parity block (P4) is to be located on the target SD. RAID Stripe RS_5 is subsequently written to the storage array.

Finally, RAID Stripe RS_6 is written to the storage array. At this stage, all RAID stripes that existed in the storage array at the time the modified garbage collection operation was initiated have been processed. Accordingly, referring to FIG. 10B, all processed RAID stripes (i.e., RAID Stripes RS_0-RS_3) are erased and SD 2 may be removed. SD 2 may be removed prior to the dead blocks being erased without departing from the invention.

Those skilled in the art will appreciate that while the invention has been described with respect to a single dimension RAID scheme, embodiments of the invention may be extended to any multi-dimensional RAID scheme. For example, embodiments of the invention may be extended to the multi-dimensional RAID scheme described in U.S. Pat. No. 8,316,260 (which is hereby incorporated by reference).

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method, the method comprising:
receiving a service notification specifying a target storage device (SD), wherein the target SD is one of a plurality of SDs in persistent storage;
after receiving the service notification:
performing a modified garbage collection operation, wherein the modified garbage collection operation comprises:
identifying a live Redundant Array of Independent Disks (RAID) stripe in the persistent storage, wherein the live RAID stripe comprises first data blocks and a first parity block;
making a determination that at least one selected from a group consisting of a data block of the first data blocks and the first parity block is a dead block and that at least one of the first data blocks is a live block;
writing a first RAID stripe to a new location in the persistent storage, wherein the first RAID stripe comprises a second parity block and second data blocks, wherein one of the second data blocks stores a copy of the live block, wherein the second parity block is stored on the target SD, wherein none of the second data blocks are stored on the target SD, and wherein content of the dead block is not stored in any of the second data blocks; and
issuing a removal notification when the modified garbage collection operation is completed, wherein the removal notification indicates that the target SD may be removed from the persistent storage.

2. The non-transitory computer readable medium of claim 1, wherein the method further comprises:
after receiving the service notification and prior the issuance of the removal notification:
receiving a request to write data to the persistent storage;
in response to the request, writing a second RAID stripe to the persistent storage, wherein the second RAID stripe comprises third data blocks and a third parity block, wherein at least one of the third data blocks comprises a portion of the data, wherein the third parity block comprises a parity value calculated using the third data blocks, and wherein the third parity block is stored on the target SD, and wherein none of the third data blocks are stored on the target SD.

3. The non-transitory computer readable medium of claim 1, wherein the live RAID stripe was stored in the persistent storage prior to receiving the service notification.

4. The non-transitory computer readable medium of claim 1, wherein the second data blocks and the second parity block are arranged according to a RAID stripe geometry, wherein the RAID stripe geometry specifies that the second parity block is located on the target SD.

5. The non-transitory computer readable medium of claim 4, wherein the first RAID stripe is associated with a second RAID stripe geometry, wherein the second RAID stripe geometry is different than the RAID stripe geometry.

6. The non-transitory computer readable medium of claim 1, wherein the first RAID stripe further comprises a third parity value, wherein the second parity value is a Q parity value, wherein the third parity value is a P parity value.

7. The non-transitory computer readable medium of claim 1, wherein the second parity block comprises at least one selected from a group consisting of a P parity value and a Q parity value.

8. The non-transitory computer readable medium of claim 1, wherein at least one of the plurality of SDs is a solid state memory device.

9. The non-transitory computer readable medium of claim 1, wherein all live RAID stripes in the persistent storage are processed by the modified garbage collection operation, wherein all live RAID stripes were stored in the persistent storage prior to the service notification, and wherein the live RAID stripe is one of the live RAID stripes.

10. The non-transitory computer readable medium of claim 1, wherein the first RAID stripe further comprises a padding data block.

11. A system, comprising:
a storage array comprising a plurality of storage devices (SDs); and
a storage controller operatively connected to the storage array and configured to:
receive a service notification specifying a target storage device (SD), wherein the target SD is one of the plurality of SDs;
after receiving the service notification:
perform a modified garbage collection operation, wherein the modified garbage collection operation comprises:
identifying a live Redundant Array of Independent Disks (RAID) stripe in the persistent storage, wherein the live RAID stripe comprises first data blocks and a first parity block;
making a determination that at least one selected from a group consisting of a data block of the first data blocks and the first parity block is a dead block and that at least one of the first data blocks is a live block;
writing a first RAID stripe to a new location in the persistent storage, wherein the first RAID stripe comprises a second parity block and second data blocks, wherein one of the second data blocks stores a copy of the live block, wherein the second parity block is stored on the target SD, wherein none of the second data blocks are stored on the target SD, and wherein content of the dead block is not stored in any of the second data blocks; and
issue a removal notification when the modified garbage collection operation is completed, wherein the removal notification indicates that the target SD may be removed from the persistent storage.

12. The system of claim 11, wherein the storage controller is further configured to:
after receiving the service notification and prior the issuance of the removal notification:
receive a request to write data to the persistent storage;
in response to the request, write a second RAID stripe to the persistent storage, wherein the third RAID stripe comprises third data blocks and a third parity block, wherein at least one of the third data blocks comprises a portion of the data, wherein the third parity block comprises a parity value calculated using the third data blocks, and wherein the third parity block is stored on the target SD, and wherein none of the third data blocks are stored on the target SD.

13. The system of claim 11, wherein the target SD is identified based on input from a user.

14. The system of claim 11, wherein the target SD is identified based upon an SD service schedule.

15. The system of claim 11, wherein the target SD is identified based upon the target SD exceeding an error event threshold.

16. The system of claim 11, wherein each of the plurality of SDs comprises NAND flash.

17. The system of claim 11, further comprising:
a field programmable gate array (FPGA) configured to calculate the second parity value for the first RAID stripe.

18. The system of claim 11, wherein the storage controller is further configured to track RAID stripe geometry for each of the plurality of live RAID stripes, wherein the RAID stripe geometry for each of the plurality of live RAID stripes is used to perform the modified garbage collection operation.

19. A method for managing persistent storage, comprising:
receiving a service notification specifying a target storage device (SD), wherein the target SD is one of a plurality of SDs in the persistent storage;
after receiving the service notification:
performing a modified garbage collection operation, wherein the modified garbage collection operation comprises:
identifying a live Redundant Array of Independent Disks (RAID) stripe in the persistent storage, wherein the live RAID stripe comprises first data blocks and a first parity block;
making a determination that at least one selected from a group consisting of a data block of the first data blocks and the first parity block is a dead block and that at least one of the first data blocks is a live block;
writing a first RAID stripe to a new location in the persistent storage, wherein the first RAID stripe comprises a second parity block and second data blocks, wherein one of the second data blocks stores a copy of the live block, wherein the second parity block is stored on the target SD, wherein none of the second data blocks are stored on the target SD, and wherein content of the dead block is not stored in any of the second data blocks; and
issuing a removal notification when the modified garbage collection operation is completed, wherein the removal notification indicates that the target SD may be removed from the persistent storage.

20. The method of claim 19, further comprising:
after receiving the service notification and prior the issuance of the removal notification:
receiving a request to write data to the persistent storage;
in response to the request, writing a second RAID stripe to the persistent storage, wherein the second RAID stripe comprises third data blocks and a third parity block, wherein at least one of the third data blocks comprises a portion of the data, wherein the third parity block comprises a parity value calculated using the third data blocks, and wherein the third parity block is stored on the target SD, and wherein none of the third data blocks are stored on the target SD.

* * * * *